US008429947B2

(12) United States Patent
Akimoto et al.

(10) Patent No.: US 8,429,947 B2
(45) Date of Patent: Apr. 30, 2013

(54) APPARATUS AND METHOD FOR SHAPING ELECTRIC WIRE FOR STATOR COIL OF ELECTRIC ROTATING MACHINE

(75) Inventors: Akito Akimoto, Kariya (JP); Noriyuki Fukui, Kariya (JP); Kazuhiro Nobata, Chiryu (JP)

(73) Assignee: Denso Corporation, Kariya (JP)

( * ) Notice: Subject to any disclaimer, the term of this patent is extended or adjusted under 35 U.S.C. 154(b) by 502 days.

(21) Appl. No.: 12/754,817

(22) Filed: Apr. 6, 2010

(65) Prior Publication Data

US 2010/0251796 A1    Oct. 7, 2010

(30) Foreign Application Priority Data

Apr. 6, 2009   (JP) ................................. 2009-092122
Mar. 2, 2010   (JP) ................................. 2010-045343

(51) Int. Cl.
   *B21D 41/00*   (2006.01)
(52) U.S. Cl.
   USPC .................. 72/396; 72/382; 72/383; 72/385; 72/414; 72/475
(58) Field of Classification Search ................ 72/353.2, 72/354.8, 381, 382, 383, 385, 386, 396, 398, 72/399, 414, 415, 475; 140/123
   See application file for complete search history.

(56) References Cited

U.S. PATENT DOCUMENTS

| 240,174 | A | * | 4/1881 | Pearce | 72/382 |
| 2,566,414 | A | * | 9/1951 | Henry | 72/362 |
| 3,343,397 | A | * | 9/1967 | Fournier et al. | 72/375 |
| 5,295,303 | A | * | 3/1994 | Ogawa et al. | 29/890.049 |
| 5,918,497 | A | * | 7/1999 | Mieda | 72/177 |
| 6,314,780 | B1 | * | 11/2001 | Naka et al. | 72/213 |
| 6,755,069 | B1 | * | 6/2004 | Pelletier et al. | 72/414 |
| 6,948,350 | B2 | * | 9/2005 | Ono et al. | 72/329 |
| 7,134,311 | B2 | * | 11/2006 | Iwabuchi | 72/414 |
| 7,454,940 | B2 | * | 11/2008 | Saitou | 72/349 |
| 7,650,773 | B2 | * | 1/2010 | Shikano et al. | 72/382 |

FOREIGN PATENT DOCUMENTS

| JP | 8-163838 | 6/1996 |
| JP | 2003-264964 | 9/2003 |
| JP | 2009-207306 | 9/2009 |

* cited by examiner

*Primary Examiner* — Edward Tolan
(74) *Attorney, Agent, or Firm* — Nixon & Vanderhye P.C.

(57) ABSTRACT

An electric wire shaping apparatus includes a pair of male and female shaping dies and a pressing mechanism. Each of the male and female shaping dies has a shaping surface that includes a plurality of straight parts and a plurality of bent parts. The pressing mechanism moves one of the male and female shaping dies toward the other, thereby pressing a turn portion of an electric wire between the shaping surfaces of the male and female shaping dies in a width-wise direction of the turn portion. Furthermore, the male and female shaping dies are so configured that when they are located closest to each other, a gap W2 between a corresponding pair of the bent parts of the shaping surfaces of the male and female shaping dies is different in size from a gap W1 between a corresponding pair of the straight parts of the shaping surfaces.

7 Claims, 12 Drawing Sheets

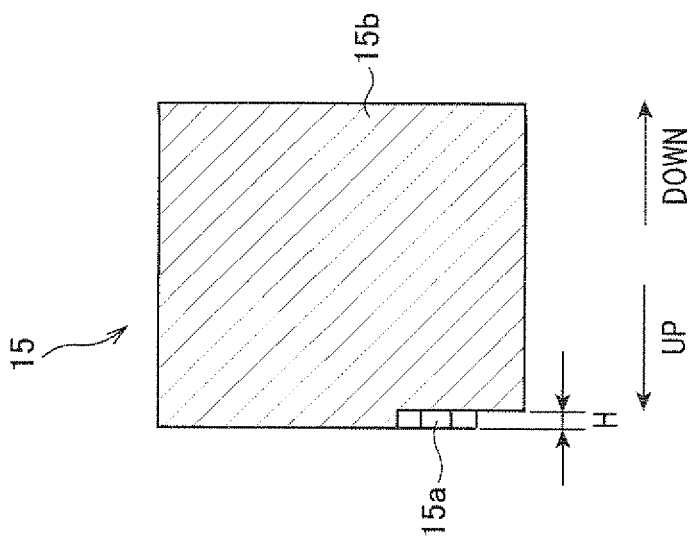
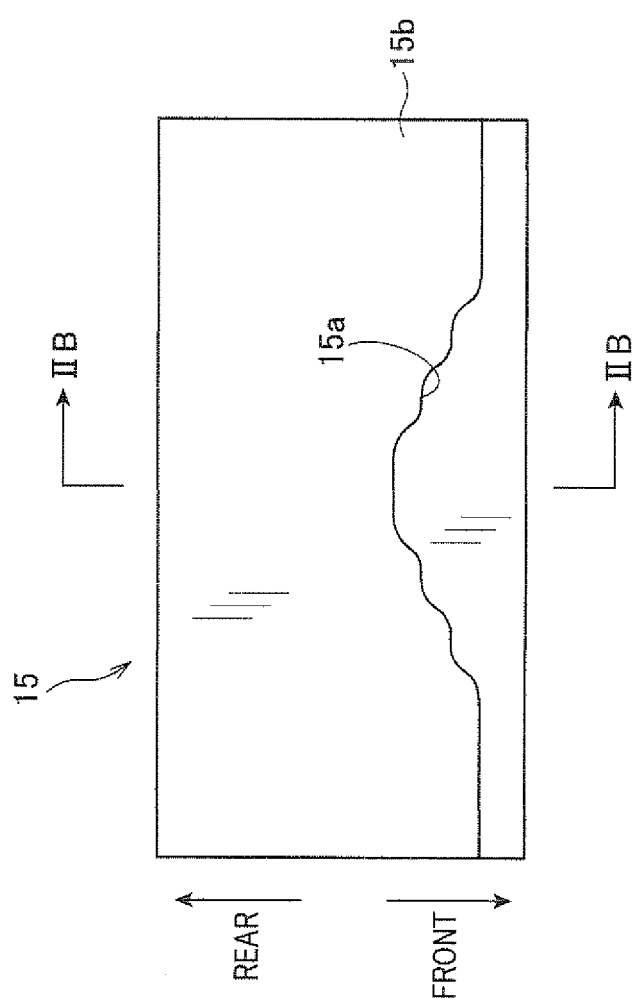

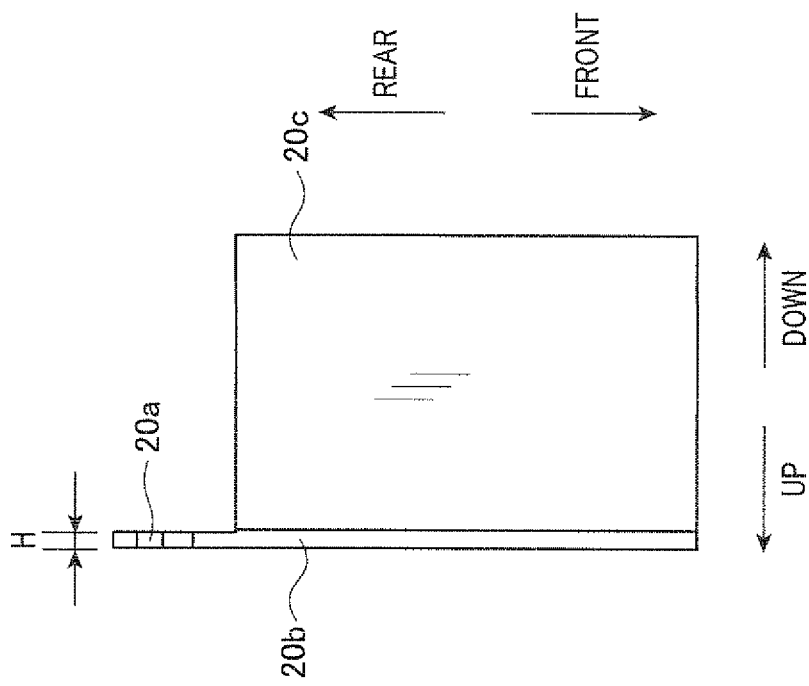
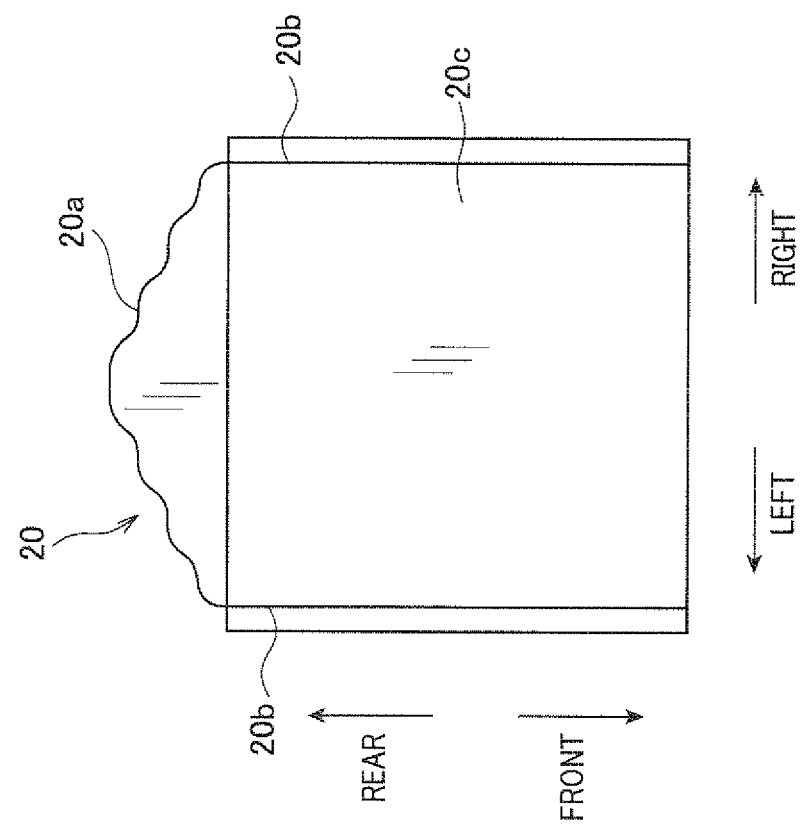

APPARATUS AND METHOD FOR SHAPING ELECTRIC WIRE FOR STATOR COIL OF ELECTRIC ROTATING MACHINE

CROSS-REFERENCE TO RELATED APPLICATIONS

This application is based on and claims priority from Japanese Patent Applications No. 2009-92122, filed on Apr. 6, 2009, and NO. 2010-45343, filed on Mar. 2, 2010, the contents of which are hereby incorporated by reference in their entirety into this application.

BACKGROUND OF THE INVENTION

1. Technical Field of the Invention

The present invention relates generally to apparatuses and methods for manufacturing electric rotating machines that are used in, for example, motor vehicles as electric motors and electric generators.

More particularly, the invention relates to an apparatus and a method for shaping an electric wire for a stator coil of an electric rotating machine to form coil ends of the stator coil into a desired shape. Hereinafter, the coil ends denote the axial end portions of the stator coil which are located outside of slots of a stator core of the electric rotating machine.

2. Description of the Related Art

Generally, to increase the torque density of an electric rotating machine, it is necessary to improve the space factors of electric wires, which form a stator coil of the machine, by, for example, employing rectangular-cross-section wires as the electric wires. In addition, it is also necessary to minimize the coil ends of the stator coil which have almost no contribution to the generation of torque by the electric rotating machine. Further, the coil ends of the stator coil can be minimized by, for example, providing crank-shaped portions in the coil ends.

Japanese Unexamined Patent Application Publication No. 2003-264964 discloses a method of providing crank-shaped portions in the coil ends of a stator coil of an electric rotating machine. According to the method, an electric wire with a rectangular cross section is first shaped, using a first pair of male and female shaping dies, on a first plane to form a two-dimensional crank-shaped portion in the electric wire. Then, the electric wire is further shaped, using a second pair of male and female shaping dies, on a second plane which is perpendicular to the first plane to form a three-dimensional turn portion of the electric wire. The turn portion is to be located outside of slots of a stator core of the electric rotating machine and thus constitutes a part of the coil ends of the stator coil. The turn portion has a triangular overall shape and includes the crank-shaped portion at the apex thereof. Next, with the turn portion being held between the second pair of shaping dies, the electric wire is bent at each end of the turn portion using a female bending die, thereby forming a pair of straight portions of the electric wire. The straight portions are connected by the turn portion and to be respectively received in two slots of the stator core.

Conventionally, shaping dies used for shaping electric wires, including those disclosed in Japanese Unexamined Patent Application Publication No. 2003-264964, are made according to the desired finished dimensions of the electric wires.

For example, when a pair of male and female shaping dies is used to form a turn portion 92 of an electric wire which has a stepped shape as shown in FIG. 13A, the gap Wa between the shaping surfaces 91 and 90 of the male and female shaping dies is conventionally set constant over the entire length of the turn portion 92. In other words, the gap Wa between the shaping surfaces 91 and 90 for a straight part of the turn portion 92 is made equal to that for a bent part of the same. In addition, the gap Wa is also set to be equal to a desired finished width of the turn portion 92.

However, the electric wire may be an insulation-coated electric wire which includes an electric conductor and an electric insulator that covers the electric conductor. In this case, with the constant gap Wa, it is difficult to shape the turn portion 92 of the electric wire to have the desired finished width for all the parts of the turn portion 92 due to the expansion and contraction of the insulator during the shaping process. More specifically, on the bending outside of a bent part of the turn portion 92, the insulator is expanded in the length-wise direction and thinned in the width-wise direction of the turn portion 92, thereby lowering the withstand voltage of the electric wire. Consequently, during operation of an electric rotating machine, which includes a stator coil formed with the electric wire and other electric wires shaped in the same way as the electric wire, electric discharge may occur between those electric wires. On the other hand, on the bending inside of the bent part, the insulator is contracted in the length-wise direction and thickened in the width-wise direction of the turn portion 92, thereby bulging in the width-wise direction. Consequently, it is difficult to densely wind, in multiple layers, the electric wire together with the other electric wires shaped in the same way as it to form the stator coil of the electric rotating machine.

Furthermore, when the insulator is made of a thermoplastic resin which has already been crystallized and is thus hard, it is possible for cracks to occur in the insulator, thereby lowering the insulation performance of the insulator. On the other hand, when the insulator is made of a thermoplastic resin which has not been yet crystallized and is thus soft, the insulator tends to return to its initial shape after the shaping process, as indicated with arrows in FIG. 13B. Consequently, it is difficult to shape the turn portion 92 to satisfy the desired finished dimension thereof.

SUMMARY OF THE INVENTION

According to one aspect of the present invention, there is provided an electric wire shaping apparatus for shaping a turn portion of an electric wire for a stator coil of an electric rotating machine. The electric wire is comprised of an electric conductor with a rectangular cross section and an electric insulator that covers the electric conductor. The turn portion of the electric wire is to be located outside of slots of a stator core of the electric rotating machine and connects a pair of straight portions of the electric wire which are to be respectively received in two of the slots of the stator core. The electric wire shaping apparatus includes a pair of male and female shaping dies and a pressing mechanism. The male shaping die has a shaping surface that includes a plurality of straight parts and a plurality of bent parts. The female shaping die also has a shaping surface that includes a plurality of straight parts and a plurality of bent parts. Each of the straight parts of the shaping surface of the female shaping die corresponds to one of the straight parts of the shaping surface of the male shaping die. Each of the bent parts of the shaping surface of the female shaping die corresponds to one of the bent parts of the shaping surface of the male shaping die. The pressing mechanism moves one of the male and female shaping dies toward the other, thereby pressing the turn portion of the electric wire between the shaping surfaces of the male and female shaping dies in a width-wise direction of the turn portion. Furthermore, in the electric wire shaping apparatus, the male and female shaping dies are so configured that when they are located closest to each other, a gap W2 between a corresponding pair of the bent parts of the shaping surfaces of the male and female shaping dies is different in size from a gap W1 between a corresponding pair of the straight parts of the shaping surfaces.

With the above configuration, it is possible to make the width of a bent part of the turn portion of the electric wire equal to that of a straight part of the same even when the degree of deformation of the insulator at the bent part of the turn portion is different from that at the straight part during the pressing of the turn portion. Accordingly, it is possible to shape the turn portion of the electric wire to have a desired finished width in all the parts of the turn portion.

In further implementations of the present invention, the gap W2 may be set smaller than the gap W1.

The gap W2 may be preferably made different in size from the gap W1 by offsetting at least one of the centers of curvature of the corresponding pair of the bent parts of the shaping surfaces in a given direction by a given distance.

The electric wire shaping apparatus may preferably further include a suppressing mechanism that presses the turn portion of the electric wire in a thickness-wise direction of the turn portion, thereby suppressing the turn portion from bulging in the thickness-wise direction during the pressing of the turn portion by the pressing mechanism.

Further, the suppressing mechanism may be comprised of a pressing plate that presses the turn portion of the electric wire and at least one elastic member that applies an elastic force to the pressing plate in the thickness-wise direction of the turn portion toward the turn portion.

The electric wire shaping apparatus may preferably further include a keeping mechanism that keeps the interval between the pair of straight portions of the electric unchanged during the pressing of the turn portion by the pressing mechanism.

According to another aspect of the present invention, there is provided a method of shaping a turn portion of an electric wire for a stator coil of an electric rotating machine. The electric wire is comprised of an electric conductor with a rectangular cross section and an electric insulator that covers the electric conductor. The turn portion of the electric wire is to be located outside of slots of a stator core of the electric rotating machine and connects a pair of straight portions of the electric wire which are to be respectively received in two of the slots of the stator core. The method includes the steps of: (1) preparing a pair of male and female shaping dies each of which has a shaping surface that includes a plurality of straight parts and a plurality of bent parts, each of the straight parts of the shaping surface of the male shaping die corresponding to one of the straight parts of the shaping surface of the female shaping die, each of the bent parts of the shaping surface of the male shaping die corresponding to one of the bent parts of the shaping surface of the female shaping die; (2) setting the turn portion of the electric wire between the shaping surfaces of the male and female shaping dies; and (3) moving one of the male and female shaping dies toward the other, thereby pressing the turn portion of the electric wire between the shaping surfaces of the male and female shaping dies in a width-wise direction of the turn portion. Furthermore, in the method, the male and female shaping dies are so configured that when they are located closest to each other, a gap W2 between a corresponding pair of the bent parts of the shaping surfaces of the male and female shaping dies is different in size from a gap W1 between a corresponding pair of the straight parts of the shaping surfaces.

With the above method, it is possible to make the width of a bent part of the turn portion of the electric wire equal to that of a straight part of the same even when the degree of deformation of the insulator at the bent part of the turn portion is different from that at the straight part during the pressing of the turn portion. Accordingly, it is possible to shape the turn portion of the electric wire to have a desired finished width in all the parts of the turn portion.

In the method, the gap W2 may be set smaller than the gap W1. The method may preferably further include the step of suppressing the turn portion of the electric wire in a thickness-wise direction of the turn portion, thereby suppressing the turn portion from bulging in the thickness-wise direction during the pressing of the turn portion in the width-wise direction.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 2A is a plan view of a female shaping die of the electric wire shaping apparatus;

FIG. 2B is a cross-sectional view of the female shaping die taken along the line IIB-IIB in FIG. 2A;

FIG. 3A is a plan view of a male shaping die of the electric wire shaping apparatus;

FIG. 3B is a side view of the male shaping die;

DESCRIPTION OF PREFERRED EMBODIMENT

One preferred embodiment of the present invention will be described hereinafter with reference to FIGS. 1-12.

Figure 1:
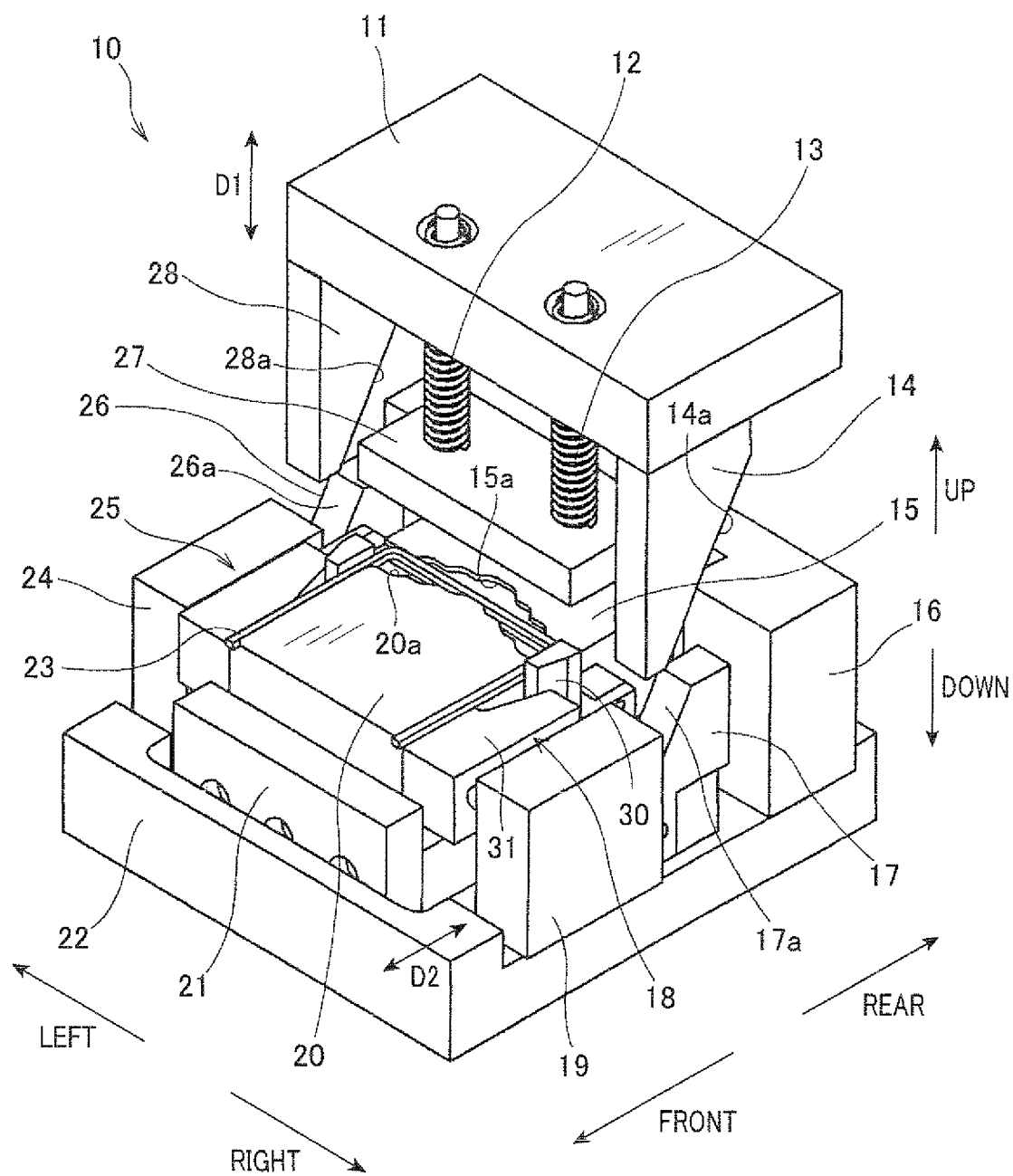
FIG. 1 is a perspective view of an electric wire shaping apparatus according to the preferred embodiment of the invention.

FIG. 1 shows the overall configuration of an electric wire shaping apparatus 10 according to the preferred embodiment of the invention. The electric wire shaping apparatus 10 is designed to shape an electric wire 23 for a stator coil of an electric rotating machine. It should be noted that for the sake of simplicity, a driving mechanism (e.g., an electric motor or actuator) for driving a moving plate 11 to reciprocate in the vertical direction D1 is omitted from FIG. 1.

In the present embodiment, the electric wire 23 is an insulation-coated electric wire which includes an electric conductor with a rectangular cross section and an electric insulator that covers the electric conductor. The electric wire 23 has a length of, for example, several meters. Moreover, referring to FIG. 11, the electric wire 23 includes a plurality of straight portions 23b and a plurality of turn portions 23a. The straight portions 23b extend straight in parallel with each other and are spaced at predetermined intervals. Each of the straight portions 23b is to be received in one of a plurality of slots of a stator core of the electric rotating machine. Each of the turn portions 23a connects one adjacent pair of the straight portions 23b and is to be located outside of the slots of the stator core to make up a part of the coil ends of the stator coil.

In addition, in FIG. 1, there is shown only one section of the electric wire 23; the section includes only one adjacent pair of the straight portions 23b and one of the turn portions 23a which connects the pair of the straight portions 23b. As to the other sections of the electric wire 23, they have the same configuration and are shaped in the same way as the section shown in FIG. 1. Therefore, for the sake of avoiding redundancy, only the process of shaping the single section of the electric wire 23 will be described hereinbelow.

As shown in FIG. 1, the electric wire shaping apparatus 10 includes the moving plate 11, a pressing plate 27, elastic members 12 and 13, protruding members 14 and 28, a pair of male and female shaping dies 20 and 15, a base 22, supporting members 16, 19, 24, a moving bed 21, and coil pitch keeping mechanisms 18 and 25.

The moving plate 11 has the shape of a hexahedron and is restricted from moving in any direction other than the vertical direction D1. As described above, the moving plate 11 is driven by the not-shown driving mechanism to reciprocate in the vertical direction D1.

The pressing plate 27 also has the shape of a hexahedron and is mounted to the lower face of the moving plate 11 via the elastic members 12 and 13. More specifically, each of the elastic members 12 and 13, which are implemented by helical springs in the present embodiment, has one end fixed to the lower face of the moving plate 11 and the other end fixed to the upper face of the pressing plate 27. The pressing plate 27 is provided to press the turn portion 23a of the section of the electric wire 23 in the vertical direction D1 during the shaping of the turn portion 23a by the electric wire shaping apparatus 10.

In addition, in the present embodiment, the pressing plate 27 and the elastic members 12 and 13 together constitute a suppressing mechanism for suppressing the turn portion 23a of the electric wire 23 from bulging in the vertical direction D1 during the shaping of the turn portion 23a.

The protruding members 14 and 28 are directly fixed to the lower face of the moving plate 11. More specifically, the protruding member 14 is fixed to a front and right corner area of the lower face of the moving plate 11 and has an inclined surface 14a inclined to the vertical direction D1. On the other hand, the protruding member 28 is fixed to a front and left corner area of the lower face of the moving plate 11 and has an inclined surface 28a inclined to the vertical direction D1.

The base 22 is disposed below the moving plate 11 and has the supporting members 16, 19, and 24 fixed thereto. More specifically, as can be seen from FIG. 1, the supporting member 16 is located on and fixed to a rear end portion of the base 22; the supporting member 19 is located on and fixed to a right end portion of the base 22; and the supporting member 24 is located on and fixed to a left end portion of the base 22. The supporting member 16 has the female shaping die 15 fixed to a front face thereof, so as to support the female shaping die 15 from the rear side.

In a recess which is formed by the base 22, the supporting members 19 and 24, and the female shaping die 15, there is disposed the moving bed 21 in such a manner as to be movable in a horizontal direction D2 (i.e., the forward/backward direction in FIG. 1).

The moving bed 21 has protruding members 17 and 26 fixed thereto. More specifically, the protruding member 17 is fixed to a right end of the moving bed 21 so as to be located under the protruding member 14 fixed to the moving plate 11. The protruding member 17 has an inclined surface 17a that is shaped so as to fit to the inclined surface 14a of the protruding member 14. On the other hand, the protruding member 26 is fixed to a left end of the moving bed 21 so as to be located under the protruding member 28 fixed to the moving plate 11. The protruding member 26 has an inclined surface 26a that is shaped so as to fit to the inclined surface 28a of the protruding member 28.

With the above configuration of the protruding members 14, 28, 17, and 26, when the moving plate 11 is driven by the driving mechanism to reciprocate in the vertical direction D1, the inclined surfaces 14a and 28a of the protruding members 14 and 28 make sliding contact respectively with the inclined surfaces 17a and 26a of the protruding members 17 and 26, thereby causing the moving bed 21 to reciprocate in the horizontal direction D2. In other words, with the sliding contacts between the inclined surfaces 14a and 17a and between the inclined surfaces 28a and 26a, the transmitting direction of the power applied by the driving mechanism is changed from the vertical direction D1 to the horizontal direction D2.

On a central portion of the moving bed 21, there is fixed the male shaping die 20. Moreover, the coil pitch keeping mechanisms 18 and 25 are arranged on the moving bed 21 so as to be respectively located on the right and left sides of the male shaping die 20.

Next, the detailed configuration of the pair of male and female shaping dies 20 and 15 according to the present embodiment will be described.

The female shaping die 15 has, as shown in FIGS. 1 and 2A-2B, a concave shaping surface 15a and a base portion 15b. The shaping surface 15a is formed in a front and upper part of the base portion 15b and has a height H that is set to be substantially equal to the thickness of the electric wire 23.

On the other hand, the male shaping die 20 has, as shown in FIGS. 1 and 3A-3B, a convex shaping surface 20a, a pair of step portions 20b, and a base portion 20c. The shaping surface 20a is formed in a rear end face of a plate-shaped protrusion that protrudes backward from a rear and upper part of the base portion 20c. The step portions 20b are respectively formed at a left and upper edge and a right and upper edge of the base portion 20c. In addition, the step portions 20b are provided to keep, together with pressing blocks 30 of the coil pitch keeping mechanisms 18 and 25 (to be described later), the interval between the adjacent pair of the straight portions 23b of the electric wire 23 unchanged during the shaping of the turn portion 23a.

Figure 4:
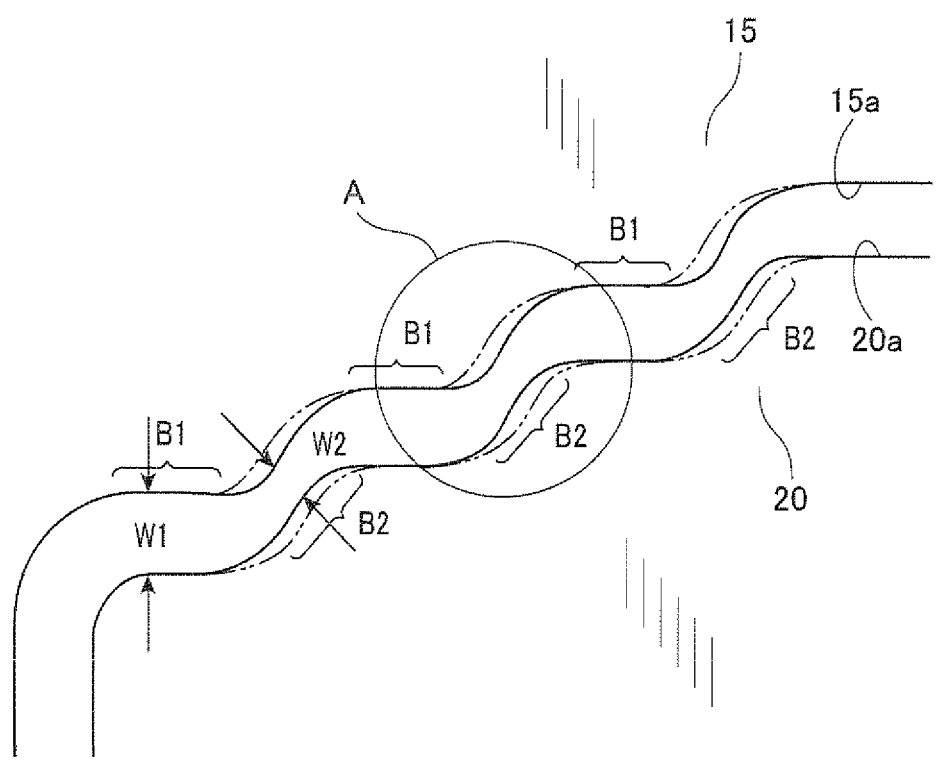
FIG. 4 is a plan view illustrating the dimensional relationship between the shaping surfaces of the male and female shaping dies when the male and female shaping dies are located closest to each other.
Figure 5:
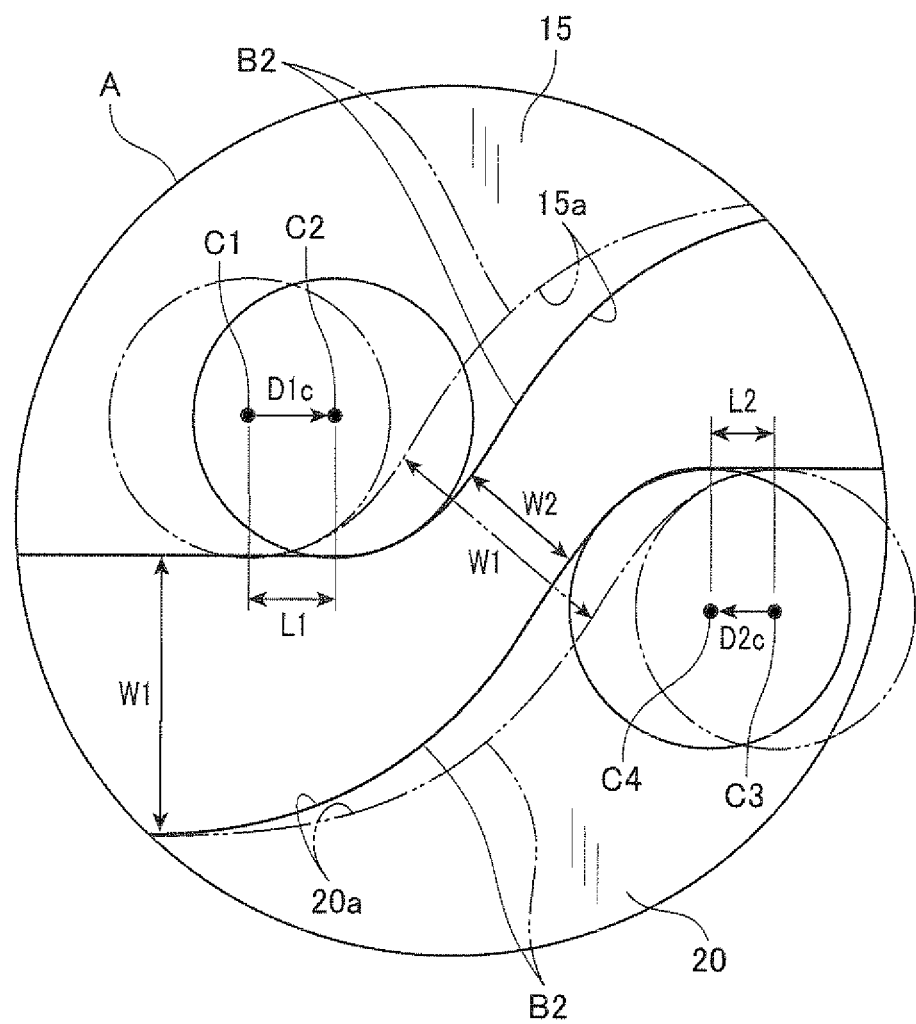
FIG. 5 is an enlarged plan view showing the circled part A of FIG. 4.

FIG. 4 illustrates the dimensional relationship between the shaping surface 15a of the female shaping die 15 and the shaping surface 20a of the male shaping die 20 when the male and female shaping dies 20 and 15 are located closest to each other during the shaping of the turn portion 20a of the electric wire 20. FIG. 5 shows the circled part A of FIG. 4 through enlargement. It should be noted that for the sake of simplicity, the electric wire 23 is omitted from those figures. In addition, for the purpose of comparison, in those figures, the shapes of the shaping surfaces 15a and 20a according to the present embodiment are indicated with continuous lines, while those according to prior art are indicated with chain double-dashed lines.

As shown in FIG. 4, in the present embodiment, each of the shaping surface 15a of the female shaping die 15 and the shaping surface 20a of the male shaping die 20 includes a plurality of straight parts B1 and a plurality of bent parts B2. Each of the straight parts B1 of the shaping surface 15a corresponds to one of the straight parts B1 of the shaping surface 20a. Each corresponding pair of the straight parts B1 of the shaping surfaces 15a and 20a together form a straight part B1 of the turn portion 23a of the electric wire 23. Similarly, each of the bent parts B2 of the shaping surface 15a corresponds to one of the bent parts B2 of the shaping surface 20a. Each corresponding pair of the bent parts B2 of the shaping surfaces 15a and 20a together form a bent part B2 of the turn portion 23a of the electric wire 23.

Further, in the present embodiment, the pair of male and female shaping dies 20 and 15 are so configured that when they are located closest to each other, the gap W2 between each corresponding pair of the bent parts B2 of the shaping surfaces 15a and 20a of the shaping dies 15 and 20 is smaller than the gap W1 between each corresponding pair of the straight parts B1 of the shaping surfaces 15a and 20a.

Moreover, in the present embodiment, the gap W2 is made smaller than the gap W1 by offsetting the centers of curvature of the bent parts B2 of the shaping surfaces 15a and 20a in given directions by given distances.

For example, as shown in FIG. 5, according to the prior art, one of the bent parts B2 of the shaping surface 15a is bent in a curve and has the center of curvature located at a point C1 inside the shaping surface 15a. In comparison, according to the present embodiment, the center of curvature is offset from the point C1, in a direction D1c toward the shaping surface 20a by a distance L1, to a point C2. Similarly, according to the prior art, one of the bent parts B2 of the shaping surface 20a is bent in a curve and has the center of curvature located at a point C3 inside the shaping surface 20a. In comparison, according to the present embodiment, the center of curvature is offset from the point C3, in a direction D2c toward the shaping surface 15a by a distance L2, to a point C4.

In addition, the directions and distances for offsetting the centers of curvature of the bent parts B2 of the shaping surfaces 15a and 20a can be suitably set according to the shapes of the bent parts B2 (for example, a circular arc or an elliptical arc shape), the lengths of the bent parts B2, the radii of curvature of the bent parts B2, and the material and thickness of the insulator of the electric wire 23. For example, when the insulator of the electric wire 23 includes a PPS (polyphenylene sulfide) layer with a thickness of 0.1 mm, it is preferable to set the distances L1 and L2 to 0.05 mm.

Figure 6:
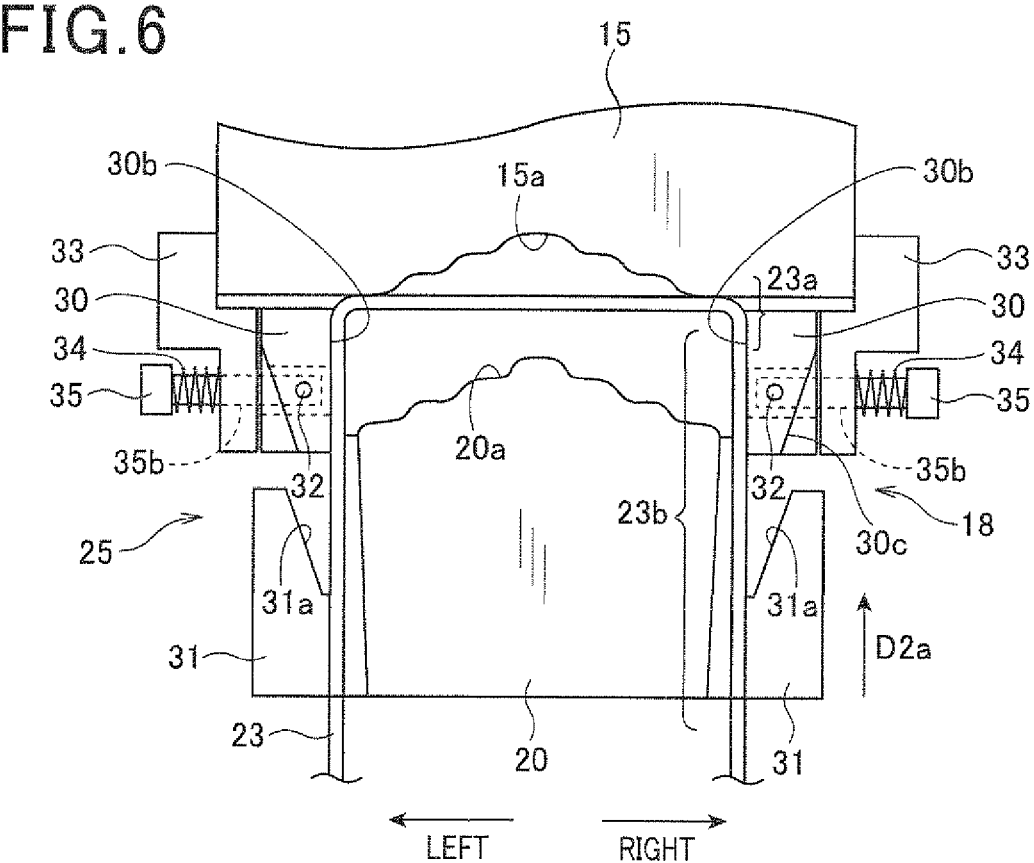
FIG. 6 is a plan view illustrating the relative position between the male and female shaping dies before the shaping of a turn portion of an electric wire by the electric wire shaping apparatus is started.

Referring now to FIG. 6, in the electric wire shaping apparatus 10, each of the coil pitch keeping mechanisms 18 and 25 includes the pressing block 30, a guiding block 31, a fixing plate 33, a helical spring 34, and a fixing member 35.

The guiding blocks 31 of the coil pitch keeping mechanisms 18 and 25 together sandwich and thereby fix therebetween the male shaping die 20 in the left-right direction. On the other hand, the fixing plates 33 of the coil pitch keeping mechanisms 18 and 25 together sandwich and thereby fix therebetween the female shaping die 15 in the left-right direction. Moreover, both the guiding block 31 and the fixing plate 33 of the coil pitch keeping mechanism 18 are supported by the supporting member 19 from the right side, whereas both the guiding block 31 and the fixing plate 33 of the coil pitch keeping mechanism 25 are supported by the supporting member 24 from the left side.

For each of the coil pitch keeping mechanisms 18 and 25, the pressing block 30 is fixed to the fixing plate 33 by means of a pin 32. More specifically, the pressing block 30 and the fixing plate 33 each have a through-hole formed therein. Further, the through-holes of the pressing block 30 and the fixing plate 33 are coaxially aligned in the left-right direction. A shaft 35b of the fixing member 35 is inserted in both the through-holes of the pressing block 30 and the fixing plate 33. The spring 34 is mounted on the shaft 35b of the fixing member 35 and located outside of the through-hole of the fixing plate 33 so as to be interposed between a head portion of the fixing member 35 and the fixing plate 33. Moreover, the pressing block 30 and an end portion of the shaft 35b of the fixing member 35 each have a pinhole extending in a direction perpendicular to the shaft 35b. The pin 32 is inserted in both the pinholes of the pressing block 30 and the end portion of the shaft 35b, with the spring 34 compressed between the head portion of the fixing member 35 and the fixing plate 33. Consequently, the pressing block 30 is urged by the elastic force of the spring 34 in a direction away from the electric wire 23.

Furthermore, for each of the coil pitch keeping mechanisms 18 and 25, the pressing block 30 has an oblique surface 30c. On the other hand, the guiding block 31 has an oblique surface 31a that is arranged to make sliding contact with the oblique surface 30c of the pressing block 30 during movement of the moving bed 21. The oblique angles of the oblique surfaces 30c and 31a are suitably set so as to keep the interval between the adjacent straight portions 23b of the electric wire 23, which defines a coil pitch of the stator coil, unchanged during the shaping of the turn portion 23a. Moreover, the pressing block 30 also has a pressing surface 30b for pressing one of the straight portions 23b of the electric wire 23 during the shaping of the turn portion 23a.

After having described the configuration of the electric wire shaping apparatus 10 according to the present embodiment, the process of the apparatus 10 for shaping the electric wire 23 will be described hereinafter.

In the shaping process, the section of the electric wire 23 is first set to the electric wire shaping apparatus 10 as shown in FIGS. 1 and 6.

Then, the driving mechanism drives the moving plate 11 to move downward, causing the inclined surfaces 14a and 28a of the protruding members 14 and 28 to respectively make sliding contact with the inclined surfaces 17a and 26a of the protruding members 17 and 26 and thereby causing the moving bed 21 to move backward (i.e., in the direction D2a shown in FIG. 6). Consequently, the male shaping die 20 and the guiding blocks 31 of the coil pitch keeping mechanisms 18 and 25 are also moved backward along with the moving bed 21.

Figure 7:
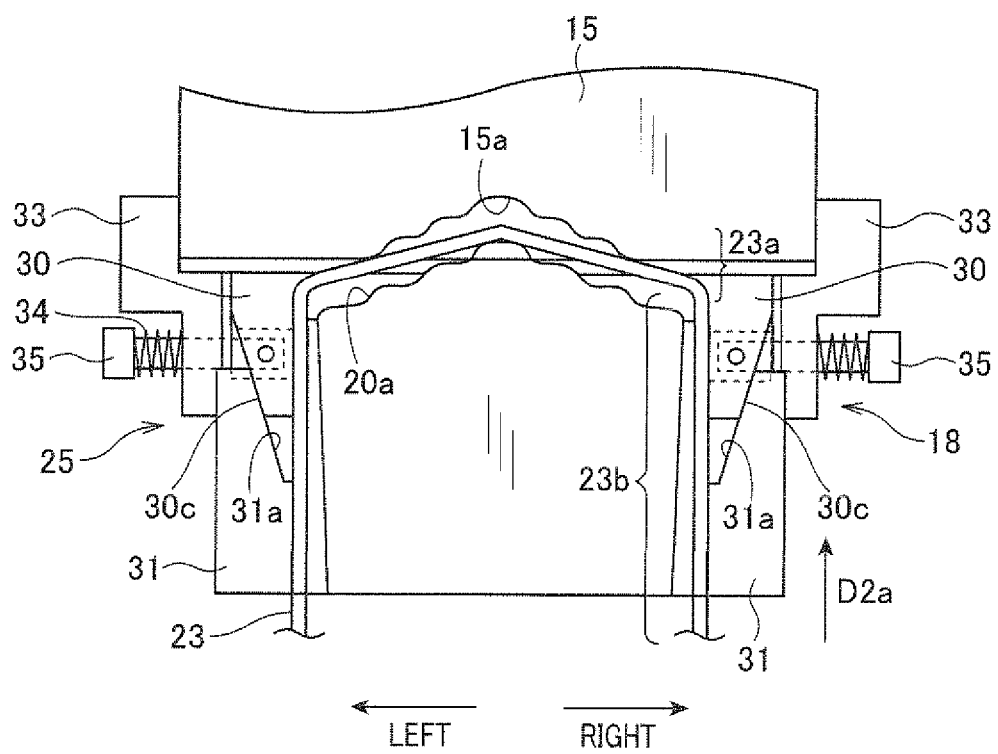
FIG. 7 is a plan view illustrating the relative position between the male and female shaping dies during the shaping of the turn portion of the electric wire.

During the backward movement of the male shaping die 20 and the guiding blocks 31, the turn portion 23a of the electric wire 23 is first bent into a triangular shape as shown in FIG. 7, and the oblique surfaces 31a of the guiding blocks 31 are brought into sliding contact with the oblique surfaces 30c of the pressing blocks 30.

Figure 8:
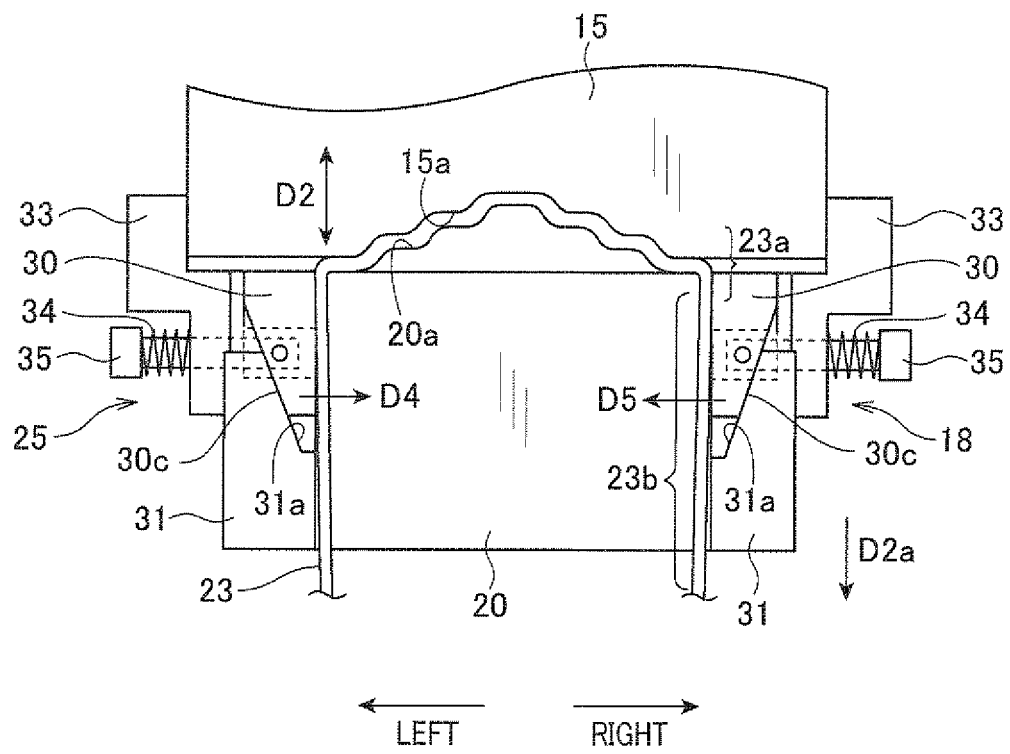
FIG. 8 is a plan view illustrating the relative position between the male and female shaping dies when the shaping of the turn portion of the electric wire has just finished.
Figure 9:
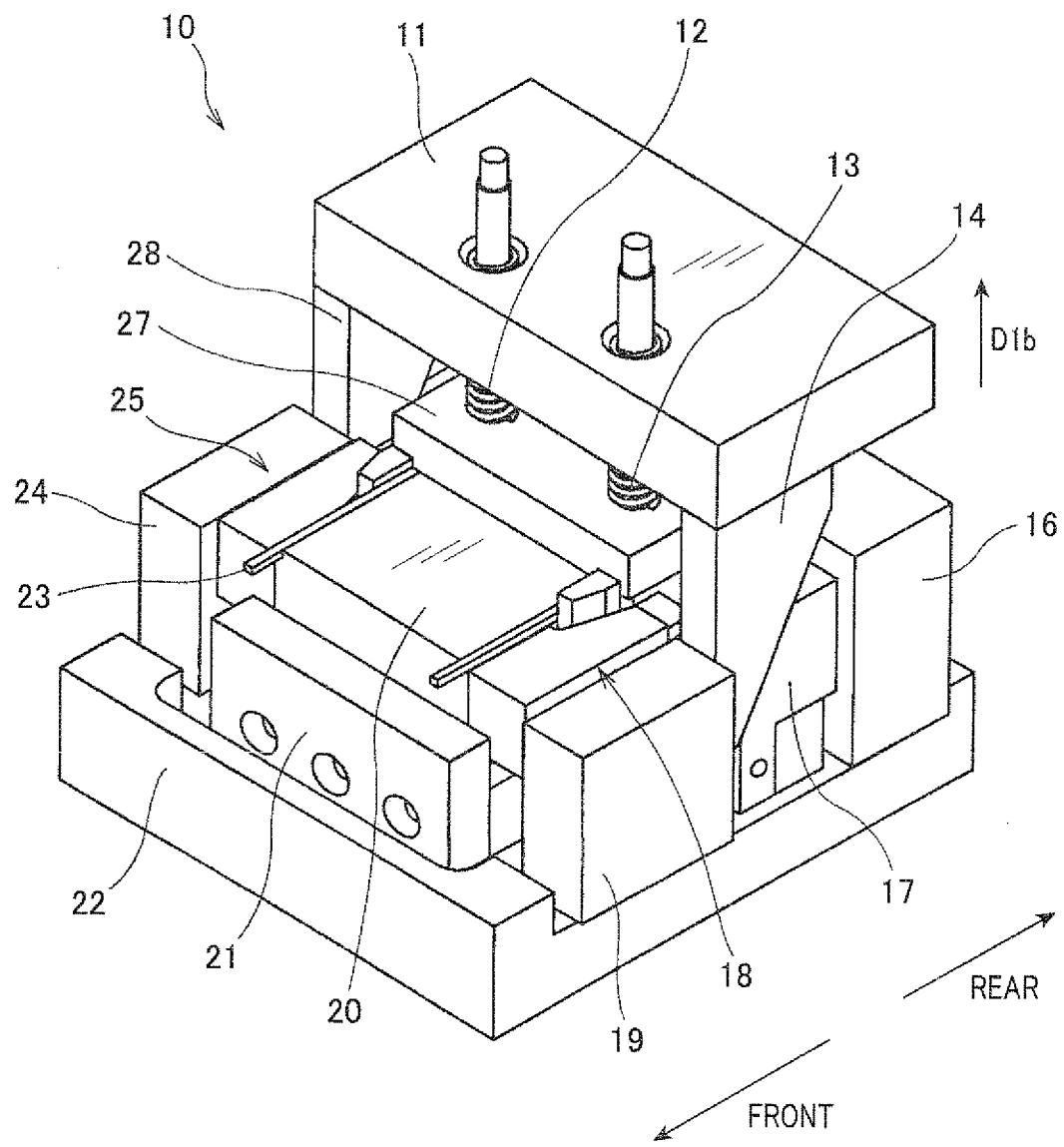
FIG. 9 is a perspective view illustrating the electric wire shaping apparatus when the shaping of the turn portion of the electric wire has just finished.

When the male shaping die 20 has been moved backward to reach a shaping finish position as shown in FIGS. 8 and 9, the turn portion 23a of the electric wire 23 is pressed between the male and female shaping dies 20 and 15, thereby being imparted a stepped shape by the shaping surfaces 20a and 15a of the shaping dies 20 and 15.

More specifically, as shown in FIG. 8, the turn portion 23a of the electric wire 23 is pressed in its width-wise direction between the shaping surface 20a of the male shaping die 20 and the shaping surface 15a of the female shaping die 15, thereby being stepped to include the plurality of straight parts B1 and the plurality of bent parts B2.

That is to say, the electric wire shaping apparatus 10 includes a pressing mechanism that is comprised of the driving mechanism, the moving plate 11, the protruding members 14, 28, 17, and 26, and the moving bed 21. The pressing mechanism moves the male shaping die 20 toward the female shaping die 15, thereby pressing the turn portion 23a of the electric wire 23 in its width-wise direction between the shaping surfaces 20a and 15a of the male and female shaping dies 20 and 15. Similarly, the process of the electric wire shaping apparatus 10 for shaping the electric wire 23 includes a pressing step in which the male shaping die 20 is moved toward the female shaping die 15, thereby pressing the turn portion 23a of the electric wire 23 in its width-wise direction between the shaping surfaces 20a and 15a of the male and female shaping dies 20 and 15.

Moreover, during the shaping process, with the sliding contact between the oblique surfaces 31a of the guiding blocks 31 and the oblique surfaces 30c of the pressing blocks 30, the pressing blocks 30 are moved respectively in the horizontal directions D4 and D5 shown in FIG. 8 against the elastic forces of the springs 34, thereby pressing the straight portions 23b of the electric wire 23 respectively in the directions D4 and D5. More specifically, in FIG. 8, the left-side straight portion 23b is pressed by the pressing block 30 of the coil pitch keeping mechanism 25 rightward (i.e., in the horizontal direction D4), while the right-side straight portion 23b is pressed by the pressing block 30 of the coil pitch keeping mechanism 18 leftward (i.e., in the horizontal direction D5). Consequently, under the pressing forces of the pressing blocks 30, the interval between the straight portions 23b and thus the coil pitch defined by the interval can be kept unchanged during the shaping process.

In addition, during the shaping process, referring to FIG. 9, the pressing plate 27 presses, under the elastic forces of the elastic members 12 and 13, the turn portion 23a of the electric wire 23 in its thickness-wise direction, thereby suppressing the turn portion 23a from bulging in the thickness-wise direction.

That is to say, the process of the electric wire shaping apparatus 10 for shaping the electric wire 23 also includes a suppressing step in which the turn portion 23a of the electric wire 23 is pressed in its thickness-wise direction, thereby being suppressed from bulging in the thickness-wise direction.

Figure 10:
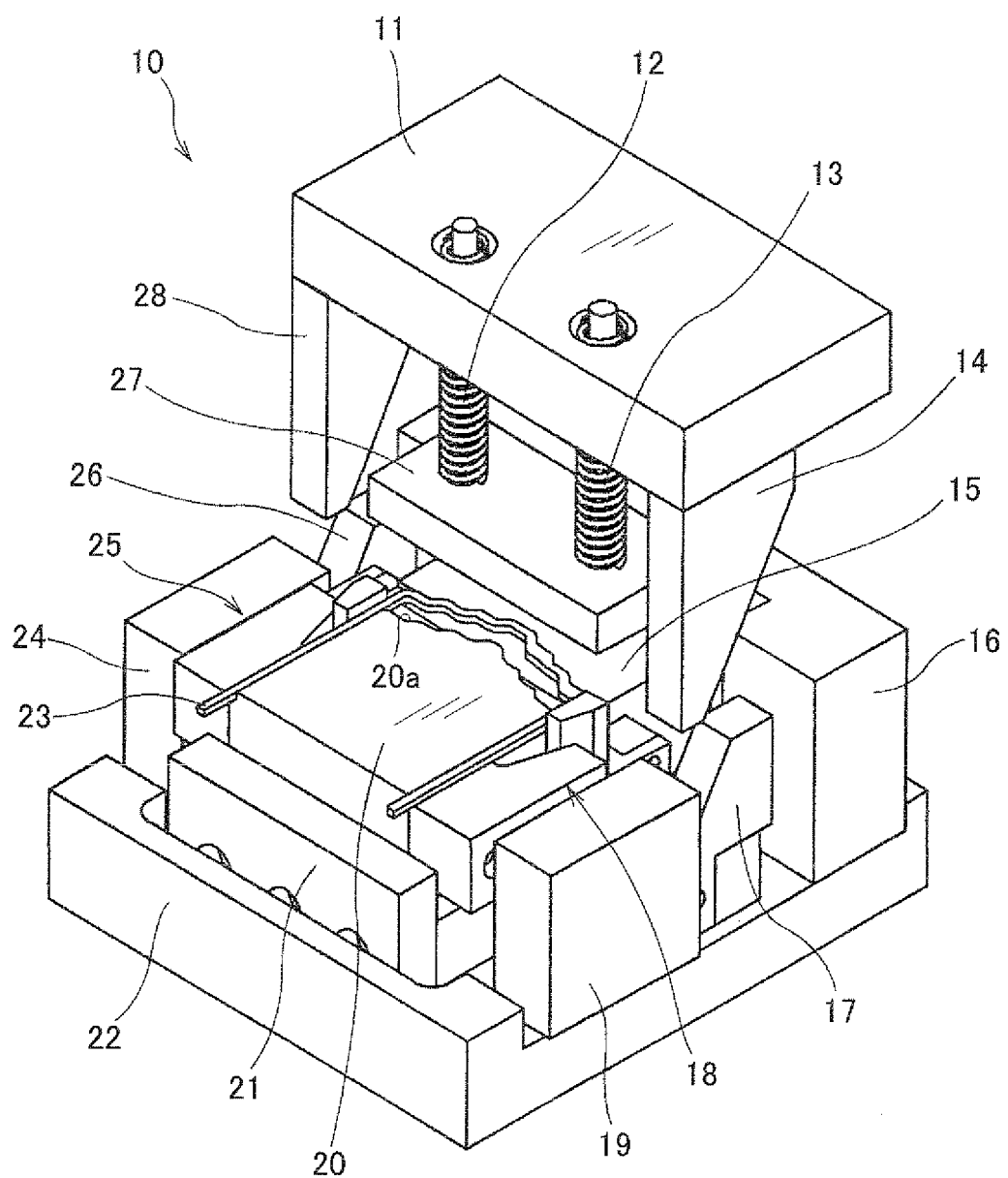
FIG. 10 is a perspective view illustrating the electric wire shaping apparatus when it has returned to its initial state after finishing the shaping of the turn portion of the electric wire.

After having finished the shaping of the turn portion 23a of the electric wire 23, the drive mechanism drives the moving plate 11 to move upward (i.e., in the direction D1b in FIG. 9), thereby causing the moving bed 21 to move forward. Consequently, the male shaping die 20 and the guiding blocks 31 of the coil pitch keeping mechanisms 18 and 25 are also moved forward (i.e., in the direction D2b in FIG. 8) along with the moving bed 21, until returning to their initial rest positions as shown in FIG. 10.

Then, the electric wire 23 is removed from the electric wire shaping apparatus 10, and the entire shaping process is thus completed.

Figure 11:
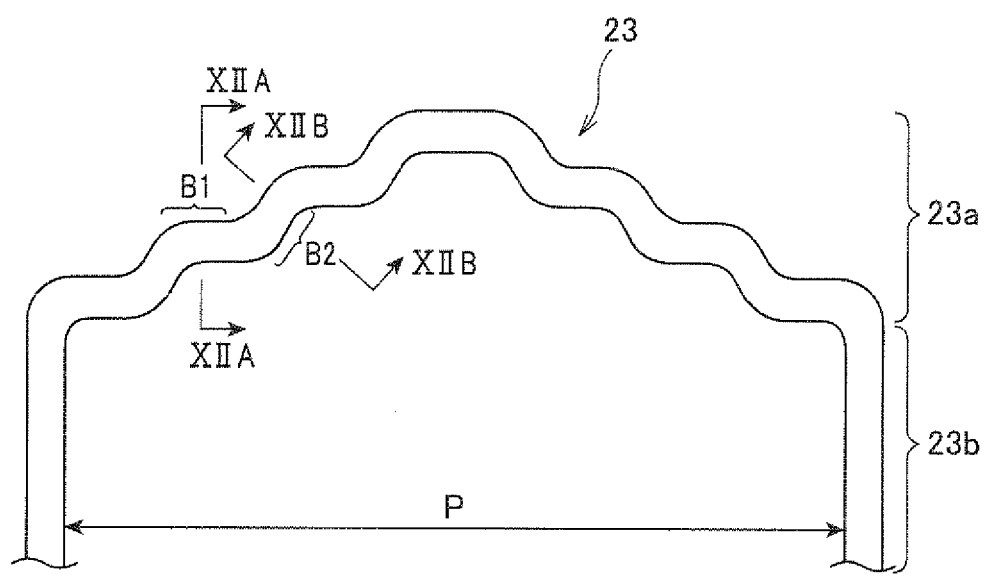
FIG. 11 is a plan view showing the turn portion of the electric wire after being shaped by the electric wire shaping apparatus.

FIG. 11 shows the turn portion 23a of the electric wire 23 after being shaped by the electric wire shaping apparatus 10. As shown in the figure, the turn portion 23a of the electric wire 23 is stepped, by the shaping process, to include the plurality of straight parts B1 and the plurality of bent parts B2. Moreover, the interval P between the straight portions 23b, which defines a coil pitch of the stator coil, is kept by the coil pitch keeping mechanisms 18 and 25 unchanged during the shaping process.

Figure 12A:
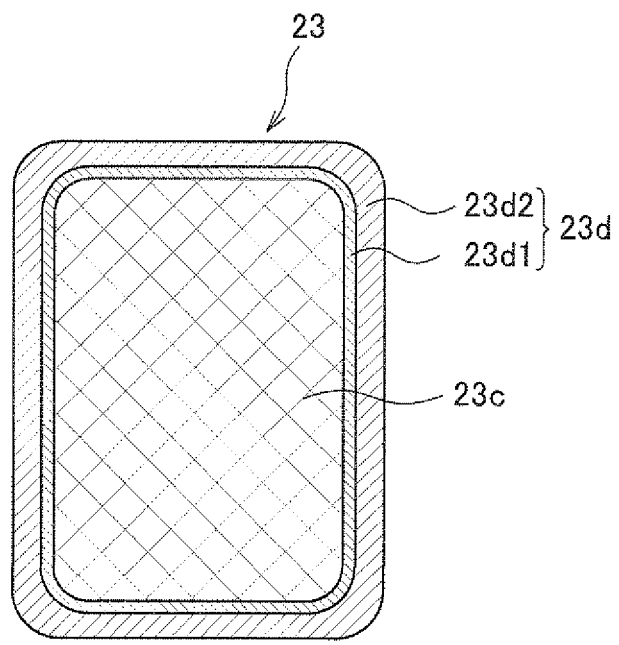
FIG. 12A is a cross-sectional view taken along the line XIIA-XIIA in FIG. 11.

Referring further to FIG. 12A, in the present embodiment, the electric wire 23 is comprised of the electric conductor 23c and the electric insulator 23d that includes an inner layer 23d1 and an outer layer 23d2. The electric conductor 23c is made of, for example, copper. The inner layer 23d1 of the insulator 23d is made of, for example, enamel. The outer layer 23d2 of the insulator 23d is made of, for example, PPS.

It can be seen from FIG. 12A that for each of the straight parts B1 of the turn portion 23a, the thickness of the insulator 23d is kept almost constant over the entire circumference of the straight part B1. Moreover, the width of each of the straight parts B1 is set to a desired finished width of the turn portion 23a.

Figure 12B:
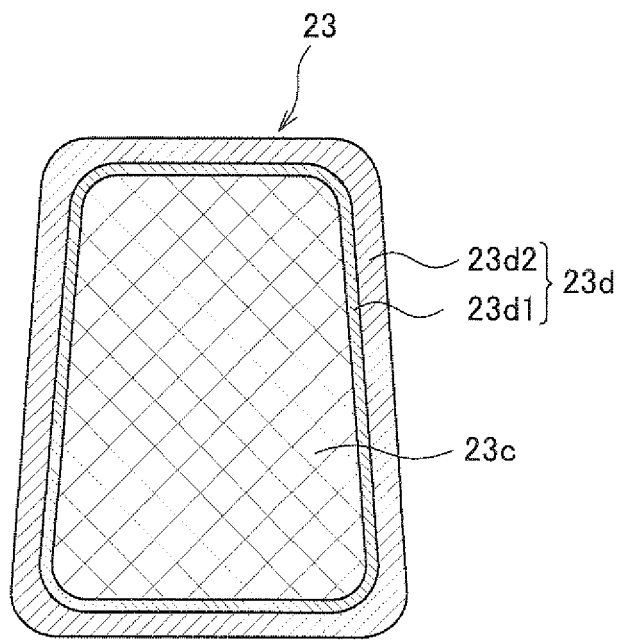
FIG. 12B is a cross-sectional view taken along the line XIIB-XIIB in FIG. 11.
Figure 13A:
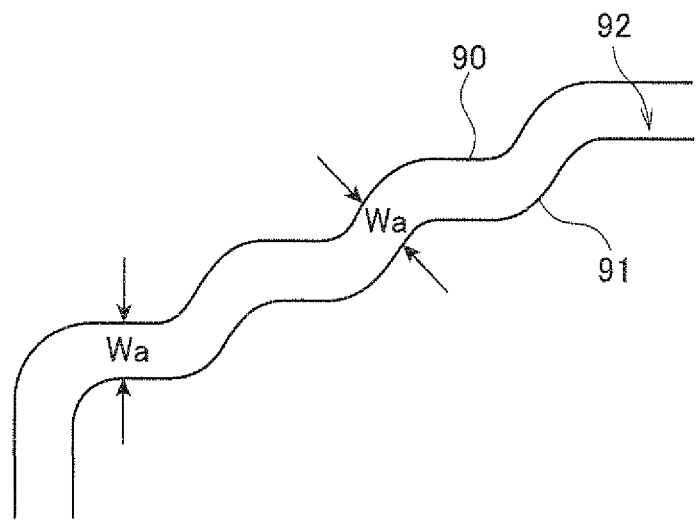
FIGS. 13A and 13B are plan views illustrating prior art.
Figure 13B:
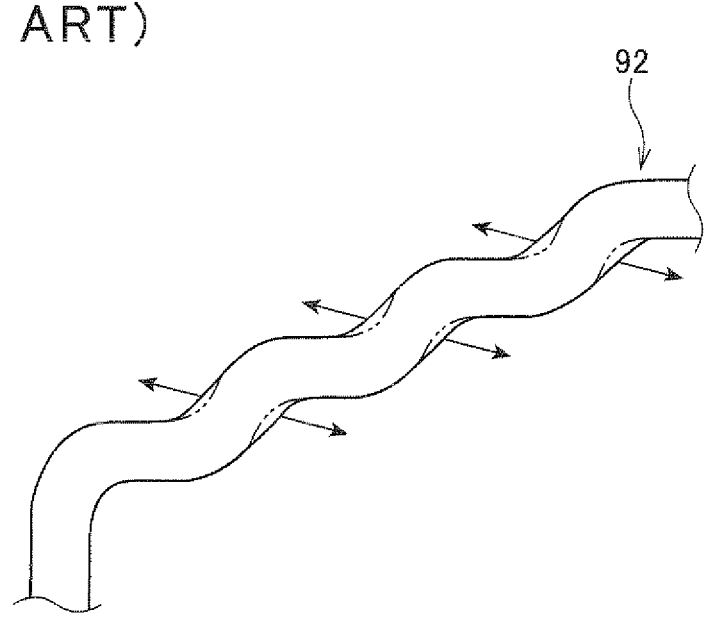

In comparison, it can be seen from FIG. 12B that for each of the bent parts B2 of the turn portion 23a, the thickness of the insulator 23d becomes uneven in the circumferential direction of the bent part B2. However, by setting the gap W2 smaller than the gap W1 for the pair of male and female shaping dies 20 and 15, it becomes possible to make the width of each of the bent parts B2 substantially equal to the width of each of the straight parts B1 of the turn portion 23a. In other words, it becomes possible to set the width of each of the bent parts B2 to the desired finished width of the turn portion 23a. Moreover, by pressing the turn portion 23a in its thickness-wise direction by the pressing plate 27, for each of the bent parts B2 of the turn portion 23a, the thickness of the insulator 23d on the bending outside of the bent part B2 (i.e., the upper side in FIG. 12B) is made substantially equal to that on the bending inside of the bent part B2 (i.e., the lower side in FIG. 12B).

According to the present embodiment, it is possible to achieve the following advantages.

In the present embodiment, the electric wire shaping apparatus 10 includes the pair of male and female shaping dies 20 and 15 and the pressing mechanism. The male shaping die 20 has the shaping surface 20a, while the female shaping die 15 has the shaping surface 15a. Each of the shaping surfaces 20a and 15a of the male and female shaping dies 20 and 15 includes the plurality of straight parts B1 and the plurality of bent parts B2. The pressing mechanism is comprised of the driving mechanism, the moving plate 11, the protruding members 14, 28, 17, and 26, and the moving bed 21. The pressing mechanism is configured to move the male shaping die 20 toward the female shaping die 15, thereby pressing the turn portion 23a of the electric wire 23 in its width-wise direction between the shaping surfaces 20a and 15a of the male and female shaping dies 20 and 15. Furthermore, in the present embodiment, the male and female shaping dies 20 and 15 are so configured that when they are located closest to each other, the gap W2 between each corresponding pair of the bent parts B2 of the shaping surfaces 15a and 20a is different in size from, and more particularly smaller than the gap W1 between each corresponding pair of the straight parts B1 of the shaping surfaces 15a and 20a.

With the above configuration, it is possible to make the width of each of the bent parts B2 of the turn portion 23a of the electric wire 23 substantially equal to the width of each of the straight parts B1 of the same even when the degree of deformation of the insulator 23*d* at the bent parts B2 of the turn portion 23*a* is different from that at the straight parts B1 during the pressing of the turn portion 23*a*. Accordingly, it is possible to shape the turn portion 23*a* of the electric wire 23 to have the desired finished width for all the straight and bent parts B1 and B2 of the turn portion 23*a*.

In the present embodiment, the gap W2 is made different in size from, more particularly smaller than the gap W1 by offsetting the centers of curvature of the bent parts B2 of the shaping surfaces 20*a* and 15*a* of the male and female shaping dies 20 and 15 in the given directions by the given distances.

With the above configuration, it is possible to easily make the male and female shaping dies 20 and 15 on the basis of conventional male and female shaping dies. Consequently, the manufacturing cost of the male and female shaping dies 20 and 15, and thus the shaping cost of the electric wire 23 can be reduced.

In the present embodiment, the electric wire shaping apparatus 10 also includes the suppressing mechanism that is comprised of the pressing plate 27 and the elastic members 12 and 13. During the pressing of the turn portion 23*a* in its width-wise direction by the pressing mechanism, the pressing plate 27 presses, under the elastic forces of the elastic members 12 and 13, the turn portion 23*a* of the electric wire 23 in its thickness-wise direction.

Consequently, with the suppressing mechanism, it is possible to suppress the turn portion 23*a* of the electric wire 23 from bulging in the thickness-wise direction during the pressing of the turn portion 23*a* in the width-wise direction by the pressing mechanism. Moreover, the thickness of the insulator 23*d* on the bending outside of each of the bent parts B2 can be made substantially equal to that on the bending inside of the same. As a result, the insulation properties of the electric wire 23 can be secured. In addition, with the above configuration of the suppressing mechanism, it is possible to provide the suppressing mechanism at low cost.

In the present embodiment, the electric wire shaping apparatus 10 further includes the coil pitch keeping mechanisms 18 and 25 each of which is comprised of the pressing block 30, the guiding block 31, the fixing plate 33, the helical spring 34, and the fixing member 35.

Consequently, with the coil pitch keeping mechanisms 18 and 25, the interval between the straight portions 23*b* of the electric wire 23 and thus the coil pitch of the stator coil defined by the interval can be kept unchanged during the pressing of the turn portion 23*a* by the pressing mechanism.

While the above particular embodiment of the present invention has been shown and described, it will be understood by those skilled in the art that various modifications, changes, and improvements may be made without departing from the spirit of the invention.

[Modification 1]

In the previous embodiment, the insulator 23*d* of the electric wire 23 is two-layer structured to include the inner layer 23*d*1 and the outer layer 23*d*2. However, the insulator 23*d* of the electric wire 23 may also have a single-layer structure.

[Modification 2]

In the previous embodiment, the outer layer 23*d*2 of the insulator 23*d* of the electric wire 23 is made of PPS which is a thermoplastic resin. However, the outer layer 23*d*2 may also be made of other thermoplastic resins, such as PET (polyethylene terephthalate), or thermosetting resins such as epoxy resins, phenol resins, FRP (fiber reinforced plastic), unsaturated polyester resins.

[Modification 3]

In the previous embodiment, the turn portion 23*a* of the electric wire 23 has an overall triangular shape and is stepped to include the plurality of straight parts B1 and the plurality of bent parts B2. However, the turn portion 23*a* may also have other shapes provided that it includes a plurality of straight parts and a plurality of bent parts. For example, the turn portion 23*a* may also be curved instead of being stepped. Otherwise, it is also possible for the turn portions 23*a* to be partially stepped and partially curved.

[Modification 4]

In the previous embodiment, the gap W2 is made smaller than the gap W1 by offsetting the centers of curvature of the bent parts B2 of both the shaping surfaces 20*a* and 15*a* of the male and female shaping dies 20 and 15. However, the gap W2 may also be made smaller than the gap W1 by offsetting the centers of curvature of the bent parts B2 of only one of the shaping surfaces 20*a* and 15*a*.

[Modification 5]

In the previous embodiment, the pressing mechanism is configured to move the male shaping die 20 toward the female shaping die 15, thereby pressing the turn portion 23*a* of the electric wire 23 between the shaping surfaces 20*a* and 15*a* of the male and female shaping dies 20 and 15. However, the pressing mechanism may also be configured to move the female shaping die 15 toward the male shaping die 20, thereby pressing the turn portion 23*a* between the shaping surfaces 20*a* and 15*a*.

[Modification 6]

In the previous embodiment, the elastic members 12 and 13 of the suppressing mechanism are implemented by the helical springs. However, the elastic members 12 and 13 may also be provided in other forms, such as rubber members and fluid springs.

Moreover, the suppressing mechanism may also include a different number of the elastic members, for example one or three.

[Modification 7]

In the previous embodiment, the power transmission direction is changed from the vertical direction D1 to the horizontal direction D2 by means of the sliding contacts between the inclined surfaces 14*a* and 17*a* of the protruding members 14 and 17 and between the inclined surfaces 28*a* and 26*a* of the protruding members 28 and 26. However, it is also possible to change the power transmission direction by other means, for example a rack and pinion mechanism.

[Modification 8]

In the previous embodiment, the driving mechanism is configured to move the moving plate 11 toward the base 22, thereby causing the male shaping die 20 to move toward the female shaping die 15. However, the driving mechanism may also be configured to move the base 22 toward the moving plate 11, thereby causing the male shaping die 20 to move toward the female shaping die 15.

What is claimed is:

1. An electric wire shaping apparatus for shaping a turn portion of an electric wire for a stator coil of an electric rotating machine, wherein the electric wire is comprised of an electric conductor with a rectangular cross section and an electric insulator that covers the electric conductor, and the turn portion of the electric wire is to be located outside of slots of a stator core of the electric rotating machine and connects a pair of straight portions of the electric wire which are to be respectively received in two of the slots of the stator core, the electric wire shaping apparatus comprising:
   a male shaping die having a shaping surface that includes a plurality of straight parts and a plurality of curved parts;
   a female shaping die having a shaping surface that includes a plurality of straight parts and a plurality of curved parts, each of the straight parts of the shaping surface of the female shaping die corresponding to one of the straight parts of the shaping surface of the male shaping die, each of the curved parts of the shaping surface of the female shaping die corresponding to one of the curved parts of the shaping surface of the male shaping die; and a pressing mechanism that moves one of the male and female shaping dies toward the other, thereby pressing the turn portion of the electric wire between the shaping surfaces of the male and female shaping dies in a widthwise direction of the turn portion, wherein the male and female shaping dies are so configured that when they are located closest to each other, a gap W2 between a corresponding pair of the curved parts of the shaping surfaces of the male and female shaping dies is smaller than a gap W1 between a corresponding pair of the straight parts of the shaping surfaces.

2. The electric wire shaping apparatus as set forth in claim 1, wherein the gap W2 is made smaller than the gap W1 by offsetting at least one of the centers of curvature of the corresponding pair of the curved parts of the shaping surfaces in a given direction to decrease the gap W2 by a given distance.

3. The electric wire shaping apparatus as set forth in claim 1, further comprising a suppressing mechanism that presses the turn portion of the electric wire in a thickness-wise direction of the turn portion, thereby suppressing the turn portion from bulging in the thickness-wise direction during the pressing of the turn portion by the pressing mechanism.

4. The electric wire shaping apparatus as set forth in claim 3, wherein the suppressing mechanism is comprised of a pressing plate that presses the turn portion of the electric wire and at least one elastic member that applies an elastic force to the pressing plate in the thickness-wise direction of the turn portion toward the turn portion.

5. The electric wire shaping apparatus as set forth in claim 1, further comprising a keeping mechanism that keeps the interval between the pair of straight portions of the electric wire unchanged during the pressing of the turn portion by the pressing mechanism.

6. A method of shaping a turn portion of an electric wire for a stator coil of an electric rotating machine, wherein the electric wire is comprised of an electric conductor with a rectangular cross section and an electric insulator that covers the electric conductor, and the turn portion of the electric wire is to be located outside of slots of a stator core of the electric rotating machine and connects a pair of straight portions of the electric wire which are to be respectively received in two of the slots of the stator core, the method comprising the steps of:

preparing a pair of male and female shaping dies each of which has a shaping surface that includes a plurality of straight parts and a plurality of curved parts, each of the straight parts of the shaping surface of the male shaping die corresponding to one of the straight parts of the shaping surface of the female shaping die, each of the curved parts of the shaping surface of the male shaping die corresponding to one of the curved parts of the shaping surface of the female shaping die;

setting the turn portion of the electric wire between the shaping surfaces of the male and female shaping dies; and moving one of the male and female shaping dies toward the other, thereby pressing the turn portion of the electric wire between the shaping surfaces of the male and female shaping dies in a width-wise direction of the turn portion, wherein the male and female shaping dies are so configured that when they are located closest to each other, a gap W2 between a corresponding pair of the curved parts of the shaping surfaces of the male and female shaping dies is smaller than a gap W1 between a corresponding pair of the straight parts of the shaping surfaces.

7. The method as set forth in claim 6, further comprising the step of suppressing the turn portion of the electric wire in a thickness-wise direction of the turn portion, thereby suppressing the turn portion from bulging in the thickness-wise direction during the pressing of the turn portion in the width-wise direction.

* * * * *